(12) United States Patent
Kagami et al.

(10) Patent No.: US 7,907,808 B2
(45) Date of Patent: Mar. 15, 2011

(54) OPTICAL WAVEGUIDE AND METHOD FOR MANUFACTURING THE SAME

(75) Inventors: Manabu Kagami, Aichi-Ken (JP); Tatsuya Yamashita, Aichi-Ken (JP); Masatoshi Yonemura, Aichi-Ken (JP); Naomichi Okamoto, Hamamatsu (JP); Masahiro Tomiki, Hamamatsu (JP)

(73) Assignees: Kabushiki Kaisha Totoya Chuo Kenkyusho, Aichi-gun, Aichi-ken (JP); National University Corporation Shizuoka University Faculity of Engineering, Shizuoka-ken (JP)

( * ) Notice: Subject to any disclaimer, the term of this patent is extended or adjusted under 35 U.S.C. 154(b) by 197 days.

(21) Appl. No.: 11/991,458

(22) PCT Filed: Sep. 5, 2006

(86) PCT No.: PCT/JP2006/317579
§ 371 (c)(1), (2), (4) Date: May 16, 2008

(87) PCT Pub. No.: WO2007/029717
PCT Pub. Date: Mar. 15, 2007

(65) Prior Publication Data
US 2009/0285532 A1    Nov. 19, 2009

(30) Foreign Application Priority Data
Sep. 6, 2005  (JP) ................. 2005-258396

(51) Int. Cl.
*G02B 6/02* (2006.01)
*G02B 6/12* (2006.01)
*G02B 6/42* (2006.01)
*G02B 6/30* (2006.01)
*G02B 6/10* (2006.01)
*G02B 6/00* (2006.01)

(52) U.S. Cl. .............. 385/123; 385/14; 385/28; 385/39; 385/42; 385/45; 385/49; 385/50; 385/129; 385/130; 385/131; 385/132; 385/141

(58) Field of Classification Search .................... 385/14, 385/28, 39, 42, 45, 49, 50, 123, 129–132, 385/141
See application file for complete search history.

(56) References Cited

U.S. PATENT DOCUMENTS
4,753,505 A * 6/1988 Mikami et al. ............... 385/5
(Continued)

FOREIGN PATENT DOCUMENTS
EP         1 284 426 A2    2/2003
(Continued)

OTHER PUBLICATIONS

Japanese Office Action dated Oct. 27, 2009 with partial English-language translation.
(Continued)

*Primary Examiner* — Brian M. Healy
*Assistant Examiner* — Hung Lam
(74) *Attorney, Agent, or Firm* — McGinn IP Law Group, PLLC

(57) ABSTRACT

A self-written branched optical waveguide is formed. A laser beam 2 from a laser source (not shown) is focused with a lens 3 onto the face of incidence 10 of an optical fiber 1. The laser beam of an $LP_{11}$ mode was emitted from the face of emergence 11, and "bimodal" light intensity peaks were arranged in the horizontal direction (1.A). A slide glass 4 coated with a photocurable resin gel 5 was placed horizontally (1.B). A single linear cured material 61 was formed as the $LP_{11}$-mode laser beam was emitted from the face of emergence 11 of the optical fiber 1 (1.C). A branch portion 62 was then formed at a distance L from the face of emergence 11 of the optical fiber 1, which was followed by the growth of two cylindrical cured materials 63a and 63b. The two cylindrical cured materials 63a and 63b were linear branches, and formed an angle of about four degrees. An optical waveguide 60 thus formed was composed of cured materials 61, 62, 63a, and 63b (1.D).

18 Claims, 2 Drawing Sheets

U.S. PATENT DOCUMENTS

| | | | |
|---|---|---|---|
| 5,015,059 A * | 5/1991 | Booth et al. | 385/49 |
| 5,030,321 A * | 7/1991 | Coutandin et al. | 216/24 |
| 5,410,627 A * | 4/1995 | Hultermans | 385/45 |
| 2003/0031414 A1 | 2/2003 | Inui et al. | |
| 2004/0234205 A1* | 11/2004 | Shimada et al. | 385/50 |
| 2005/0013578 A1 | 1/2005 | Inui et al. | |
| 2006/0199144 A1* | 9/2006 | Liu et al. | 433/29 |

FOREIGN PATENT DOCUMENTS

| | | |
|---|---|---|
| JP | 2003-57476 | 2/2003 |
| JP | 2003-207669 | 7/2003 |
| JP | 3500962 | 12/2003 |
| JP | 2004-149579 | 5/2004 |
| JP | 2004-184957 A1 | 7/2004 |
| JP | 2005-62364 | 3/2005 |
| JP | 2005-157091 | 6/2005 |
| JP | 2005-189385 | 7/2005 |

OTHER PUBLICATIONS

Renaud Bachelot, et al., Integration of micrometer-sized polymer elements at the end of optical fibers by free-radical photopolymerization, Applied Optics, vol. 40, No. 32, Nov. 10, 2001, p. 5860-5871.

* cited by examiner

Fig. 1.A
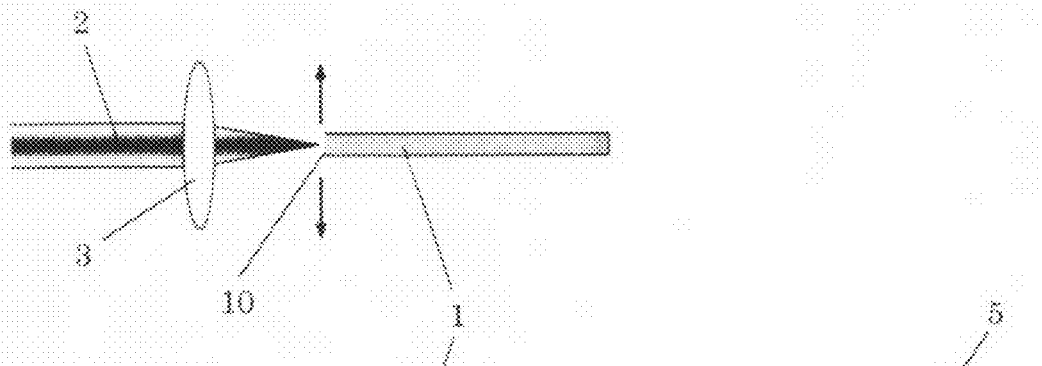
Fig. 1.B
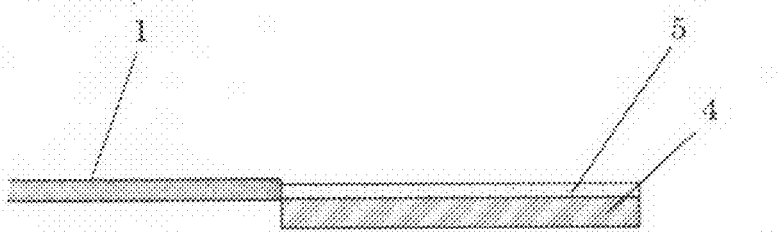
Fig. 1.C
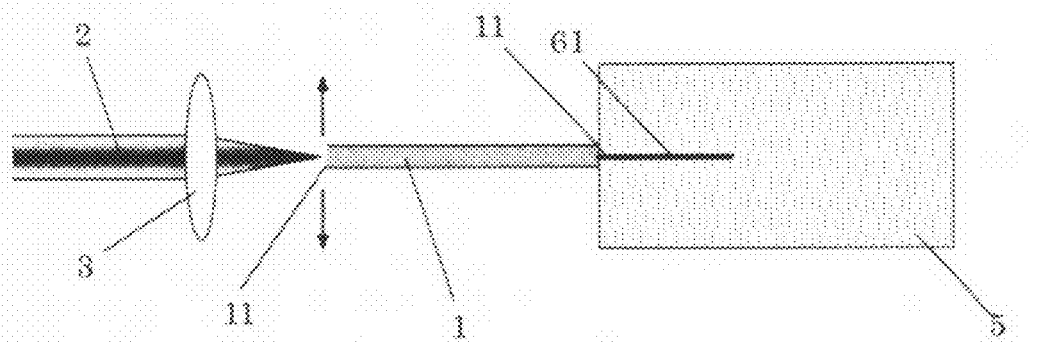
Fig. 1.D
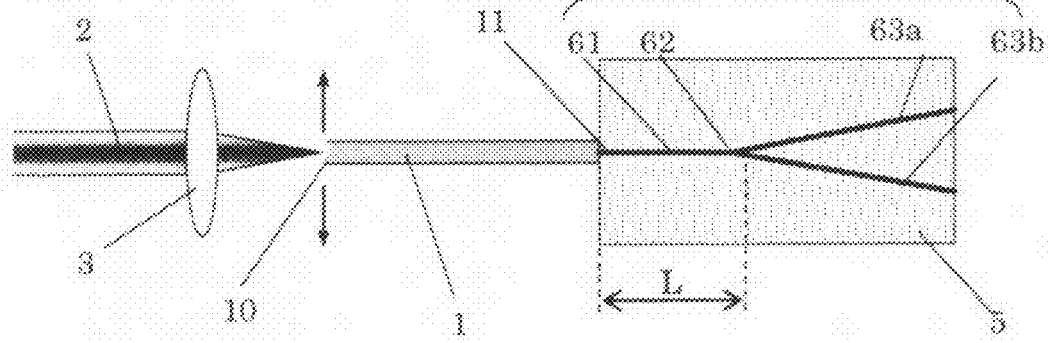

OPTICAL WAVEGUIDE AND METHOD FOR MANUFACTURING THE SAME

TECHNICAL FIELD

The present invention relates to an optical waveguide and a method for manufacturing the optical waveguide. According to the present invention, a photocurable resin is photo-cured in a so-called self-writing manner to form an optical waveguide core.

BACKGROUND ART

Optical multiplexers/optical demultiplexers are essential devices in optical integrated circuits and communication optical modules. Heretofore, various structures and manufacturing methods have been proposed. Examples are as follows:

[Patent Document 1] Japanese Unexamined Patent Application Publication No. 2005-157091

[Patent Document 2] Japanese Unexamined Patent Application Publication No. 2005-189385

[Patent Document 3] Japanese Unexamined Patent Application Publication No. 2003-207669

[Patent Document 4] Japanese Patent No. 3500962

[Non-patent Document 1] Appl. Opt., vol. 40, No. 32, pp. 5860-5871 (2001)

Patent Documents 1 and 2 disclose techniques for forming a branching waveguide by photolithography. According to these techniques, a photosensitive polymeric material is used to form a branching pattern by exposure technology, such as photolithography. Patent Document 3 discloses a technique for forming an optical waveguide by curing a resin in a groove. In this technique, an optical waveguide is formed by curing a resin in a groove having a branching pattern formed in a mold, for example, by stamping, embossing, or imprinting. Patent Document 4, which was filed by the present inventors, discloses a manufacturing method in which a half-mirror is previously disposed along the growth direction of a self-written waveguide to cause the waveguide to branch off. The term "self-written", as used herein, means that, in the curing of a photocurable resin by curing light, a cured portion serves as a core to confine the curing light because of a difference in refractive index between the cured portion and an uncured portion, thus forming an optical waveguide as the core self-grows forward. The details can also be found in other patent documents filed by the present inventors. Non-patent Document 1 reports that a self-written optical waveguide having a plurality of tips depending on the mode order can be formed by adding a photocurable resin dropwise on one end face of an optical fiber facing upward and exciting an $LP_{11}$ mode or an $LP_{21}$ mode in the optical fiber by inputting a light from the other end face of it.

DISCLOSURE OF INVENTION

Problems to be Solved by the Invention

Because the techniques described in Patent Documents 1 and 2 involve a series of steps related to photolithography, the techniques require a photomask. More specifically, the transfer of a mask pattern to a resist in an exposure step and an etching step make a branch portion blunt. In an actual communication device, scattering loss at the blunt branch portion reduces the performance of the device. Furthermore, the photolithography process involves many steps and therefore entails a high process cost. In addition, because the photolithography process is for a wafer, it entails increased packaging costs due to dicing, polishing of end faces, optical fiber connection, and so on.

In the technique described in Patent Document 3, because the groove pattern of the waveguide formed in the mold is directly transferred, the pattern of a branch portion must be very sharp. However, such a sharp pattern shortens the life of the mold, causing an increase in cost. Furthermore, even if a degree of the precision of the groove pattern is high, the shrinkage of a resin after exposing makes a branch portion blunt. Furthermore, as in the case of the techniques described in Patent Documents 1 and 2, the technique described in Patent Document 3 requires complicated packaging steps, such as cutting of end faces of a waveguide, polishing of end faces, and connection with an optical fiber.

The technique described in Patent Document 4 overcomes the problems related to dicing, polishing, and connection with an optical fiber, associated with the techniques described in Patent Documents 1 to 3. However, it is difficult to achieve trifurcation or more in branching by using a half-mirror. And also it is necessary to increase the positioning accuracy of the half-mirror and an increase in component costs cause another problem. Furthermore, in a fine waveguide, such as a single-mode waveguide, the diameter of the waveguide is as small as about 10 μm. Accordingly optical loss increases on account of an expand of optical waves if the thickness of the half-mirror as the core insert is not as small as the diameter of the waveguide.

The technique described in Non-patent Document 1 only shows that a plurality of very fine tips can be formed on an end face of an optical fiber. Thus, the technique has a limited range of application, and cannot be applied to "branching waveguide". Furthermore, even when a branching waveguide is directly formed on an end face of an optical fiber, such abrupt variations in the structure results in an increase in loss.

After Patent Document 4, the present inventors studied a self-written optical waveguide and found that a highly characteristic branching waveguide can be formed, thus perfecting the present invention.

Means for Solving the Problems

The invention according to the first aspect is an optical waveguide that includes a core formed of a photocured resin, wherein the core includes a linear portion, a branch portion linked to an end of the linear portion, and at least two branches symmetrically extending from the branch portion. Furthermore, the invention according to the second aspect is characterized in that the other end of the linear portion of the core is connected to an optical fiber. The term "linear" means that there is no bend in an optical path direction, and does not necessarily mean "cylindrical". For example, the term "linear" also encompasses those having a polygonal cross-section, those having a round, circular, or elliptic vertex, and even those having a semicircular or semielliptic vertex in view of the manufacturing process. These apply to the following description.

The invention according to the third aspect is a method for manufacturing an optical waveguide, including connecting an optical fiber to an uncured photocurable resin, and irradiating the photocurable resin with curing light that is introduced through the optical fiber at a higher mode and has a wavelength at which the photocurable resin can be cured, thereby forming a core that includes a linear portion, a branch portion linked to the linear portion, and at least two branches extending from the branch portion. The term "higher mode" expressed by LP refers to a mode other than an $LP_{01}$ mode which has no cutoff frequency. The invention according to the fourth aspect is characterized in that the photocurable resin before being irradiated with the curing light is a photocurable resin gel.

The invention according to the fifth aspect is characterized in that the curing light is introduced at both the higher mode and a lower mode. The invention according to the sixth aspect is characterized in that the lower mode is an $LP_{01}$ mode, and the ratio of the light intensity of the higher mode to the light intensity of the $LP_{01}$ mode is controlled to adjust the length of the linear portion.

The invention according to the seventh aspect is characterized in that the light intensity of the curing light is controlled to adjust the length of the linear portion. Furthermore, the invention according to the eighth aspect is characterized in that the optical fiber is a polarization-maintaining fiber, and the polarization direction of the curing light emitted from the optical fiber is adjusted to be a predetermined direction to control the branching direction at the branch portion. The branching direction of an optical transmission line is advantageously adjusted to be a desired direction by controlling the polarization direction of the curing light.

Advantages

As described below, the present inventors found that a linear optical waveguide, a branch portion, and highly symmetric branches are easily formed by curing a photocurable resin in a self-writing manner. An optical waveguide according to the present invention can be achieved by exciting a so-called higher mode of an optical wave (a mode other than the $LP_{01}$ mode) in an optical fiber, an end face of which is disposed in an uncured (which means that curing has not been completed) photocurable resin, while the optical fiber emits curing light. The length of a linear optical waveguide can be controlled by the curing light intensity or the ratio of the curing light intensity of a higher mode to the curing light intensity of a lower mode, such as a $LP_{01}$ mode. Furthermore, a photocurable resin gel is easy to handle.

The following is the reason that, when a photocurable resin is irradiated with a higher mode of the optical wave from an end face of an optical fiber, a photocured resin forms a linear optical waveguide, a branch portion, and highly symmetric branches. As is well known, the intensity of light emitted from an optical fiber at the $LP_{01}$ mode has a single center peak, that is, "unimodal". The intensity of light emitted from an optical fiber at an $LP_{11}$ mode is symmetric about the core center line of the optical fiber, that is, "bimodal". The intensity of light emitted from an optical fiber at an $LP_{21}$ mode has "four peaks" surrounding the core center line of the optical fiber. Thus, in terms of the light intensity, a single cylindrical core, two cylindrical cores, and four cylindrical cores can be expected when a photocurable resin is cured with curing light propagated in an optical fiber at the $LP_{01}$ mode, the $LP_{11}$ mode, and the $LP_{21}$ mode, respectively.

However, the present inventors found that, when a photocurable resin is cured in a self-writing manner., for example, at the $LP_{11}$ mode, a single cylindrical core is formed in the vicinity of the optical fiber. Furthermore, desired "bifurcation" was observed at 100 to 500 µm forward of the optical fiber. The position of the branch point can be controlled by the curing light intensity, as described above. Since the branch point is adjustable, it is observed that leakage light or scattered light not only promotes photopolymerization in the vicinity of the optical fiber to form two cores, but also promotes photopolymerization between the two cores, thus binding the two cores into a single core. Alternatively, it may also be understood that the two cores branch off symmetrically at a small branching angle in front of a point at which the binding of the two cores is weakened, for example, because uncured resin is incorporated into the core to form a portion having a different refractive index. Another reason for branching is that the peak position of the curing light intensity at the tip of the core may shift outward from the core center line. This shift increases the distance between the "two cores", thus weakening the binding of the two cores. Thus, 2 ml or less of branches may be formed at an $LP_{ml}$ mode (wherein m and l denote natural numbers). Furthermore, if a higher mode can further be excited at each branch formed of a photocured resin, multistep branching may be achieved.

A linear portion first formed in an optical waveguide core can reduce the mode-mismatch loss at a branch portion or branches. The length of the linear portion in an optical waveguide core about five times the core diameter of the optical waveguide or, for example, an optical fiber into which the linear portion is incorporated is sufficient to reduce the transmission loss. For example, when a core (optical waveguide) is formed on an end face of a single-mode optical fiber having a diameter of 10 µm, the length of the linear portion may be at least 50 µm. Furthermore, the polarization direction of curing light emitted from an optical fiber can be adjusted to be a predetermined direction using a polarization-maintaining optical fiber to adjust the branching direction at the branch portion to be a desired direction.

A branched optical waveguide according to the present invention can be used as an optical branching device to distribute a signal transmitted through a single optical fiber in public lines, CATVs, LANs, and other systems. Furthermore, a branched optical waveguide according to the present invention is also useful as a branch circuit of a single-mode optical waveguide in Mach-Zehnder interferometer type optical modulators or photosensors. The present invention can provide a very simple process for forming an optical waveguide, and can provide an optical branching device at low cost.

BRIEF DESCRIPTION OF DRAWINGS

FIG. 1 is a process drawing of a method for manufacturing an optical waveguide according to the present invention.

Figure 2:
FIG. 2 is a photograph of an optical waveguide (photocured resin) according to the present invention.

REFERENCE NUMERALS 1 optical fiber
10 face of incidence
11 face of emergence
2 laser beam
3 lens
4 slide glass
5 photocurable resin gel
61 cured material, linear portion
62 cured material, branch portion
63a, 63b cured material, branch

BEST MODES FOR CARRYING OUT THE INVENTION

Even when an optical fiber for use in the present invention is a fiber in which a single mode of optical wave can be propagated for a desired communication wavelength, the optical fiber must be a fiber in which a multimode of optical wave can be propagated for a curing wavelength of a photocurable resin. This is because a higher mode of optical wave cannot be excited in a fiber functioning as a single mode fiber with respect to the curing wavelength, and a branch cannot be formed.

A higher mode of optical wave may conveniently be excited in the fiber by condensing a laser beam with a lens or another device and changing the incident angle or point on an end face of an optical fiber. Alternatively, a desired higher mode of optical wave may easily be excited in the fiber using a phase mask. The excitation of a higher mode or a desired positional relationship of a plurality of peaks of the light intensity of the higher mode can conveniently be checked by observing a near-field pattern formed on the face of emergence of the optical fiber.

Furthermore, the direction of a branched optical waveguide thus formed can be controlled by the orientation of an electric power intensity distribution pattern of curing light (laser beam), that is, the polarization direction. The polarization direction, or the orientation of an electric power intensity distribution pattern, at the face of emergence of an optical fiber can consistently be controlled by using a polarization-maintaining fiber as the optical fiber, which propagates the curing light and emits the curing light from the face of emergence. When the orientation of an electric power intensity distribution pattern at the face of emergence is consistently adjusted to be a desired direction, a photocurable resin can be irradiated with the curing light while the pattern orientation is fixed. Consequently, the direction of a branched optical waveguide can be parallel, for example, to the surface of a substrate to which the photocurable resin is applied. Furthermore, for example, two branched optical transmission lines are formed parallel to the substrate surface with an $LP_{11}$-mode laser beam polarized in a predetermined direction. Then, after the polarization direction is rotated 90 degrees, the $LP_{11}$-mode laser beam is emitted from the face of emergence of the optical fiber to form additional two optical transmission lines perpendicular to the substrate surface at a desired position of each of the two branched optical transmission lines formed parallel to the substrate surface. Thus, the branching direction of an optical transmission line thus formed can be controlled by adjusting the polarization direction of curing light.

A photocurable resin for use in the present invention may be of any type depending on the design. A photocurable resin may be of a radical polymerization type, a cationic polymerization type, an anionic polymerization type, or another polymerization type. A plurality of photocurable resins of the same polymerization type may be used in combination. Furthermore, according to a technique previously described by the present inventors, two photocurable resins of different polymerization types may be mixed, and one of the two photocurable resins may be cured.

When a single polymerization type is used alone, after the formation of a core, uncured photocurable resin may be removed, and then a cladding material may be charged. Alternatively, uncured photocurable resin may be mixed or impregnated with a resin material or another material having a lower refractive index, and then may be cured to form a clad.

When photocurable resins of two polymerization types are combined, resins and a curing method described, for example, in Japanese Unexamined Patent Application Publication No. 2004-149579 or No. 2005-062364 may be used. Furthermore, any photocurable resin may be used. As a matter of course, any polymerization initiator adaptable to the polymerization type may be used. Any curing wavelength and any light source, including a laser, may be used.

Example 1

FIG. 1 is a process drawing of a method for manufacturing an optical waveguide according to a specific first example of the present invention. As illustrated in FIG. 1.A, a laser beam 2 from a laser source (not shown) is focused with a lens 3 onto the face of incidence 10 of an optical fiber 1. A near-field pattern formed on the face of emergence 11 of the optical fiber 1 is observed to confirm that light of a predetermined mode is emitted.

In the present example, the optical fiber 1 was V50-SM1300 manufactured by Suruga Seiki Co., Ltd., which had a diameter of 9.5 μm and a numerical aperture of 0.14 (at a wavelength of 1310 nm). The optical fiber 1 is a single-mode fiber for a wavelength of 1.3 μm or more. A laser source was an argon laser. The curing wavelength was 488 nm. Another light source having another wavelength at which a photocurable resin can be cured may also be used. The near-field pattern indicated that the optical fiber 1 transmitted the laser having a wavelength of 488 nm and emitted the laser of an $LP_{01}$, $LP_{11}$, or $LP_{21}$ mode from the face of emergence 11. In the present example, the laser was emitted from the face of emergence 11 at the $LP_{11}$ mode, and "bimodal" light intensity peaks were arranged in the horizontal direction.

As illustrated in FIG. 1.B (which is the only one side view), the face of emergence 11 of the optical fiber 1 was connected to a photocurable resin gel 5 disposed on a slide glass 4. The core of the face of emergence 11 of the optical fiber 1 was brought into contact with the photocurable resin gel 5 to minimize the leakage of the laser beam. The slide glass 4 coated with the photocurable resin gel 5 was placed horizontally.

As a photocurable resin, trimethylolpropane triacrylate (Toagosei Co., Ltd., product number M-309) blended with a radical photopolymerization initiator was used as a radical polymerization material. The radical polymerization material after curing has a refractive index of 1.5032 (at a wavelength of 1310 nm). Furthermore, as a cationic polymerization material, a mixture of 1 part by weight of bis(3-ethyl-3-oxetanyl) methyl ether (Toagosei Co., Ltd., product number OXT-221) and 9 parts by weight of 3,4-epoxycyclohexylmethyl-3,4-epoxycyclohexyl carboxylate (Union Carbide Co., product number UVR-6110), blended with a cationic photopolymerization initiator, was used. The cationic polymerization material after curing has a refractive index of 1.4806 (at a wavelength of 1310 nm). An optical waveguide was formed using a mixture of the radical polymerization material and the cationic polymerization material at a ratio of 90:10 by weight. This photocurable resin mixture was applied to the slide glass 4, and was irradiated with ultraviolet rays at 60 mJ/cm$^2$ from an ultraviolet lamp (main wavelength: 254 nm) to be photopolymerized into the photocurable resin gel 5. The photocurable resin gel 5 had a thickness of about 0.5 mm.

As illustrated in FIG. 1.C, a single linear cured material 61 was formed as the $LP_{11}$-mode laser beam was emitted from the face of emergence 11 of the optical fiber 1. As illustrated in FIG. 1.D, a branch portion 62 was then formed at a distance L from the face of emergence 11 of the optical fiber 1, which was followed by the growth of two cylindrical cured materials 63a and 63b. FIG. 2 is a photograph of a cured material (optical waveguide) thus formed. The two cylindrical cured materials 63a and 63b were linear branches, and formed an angle of about four degrees. An optical waveguide 60 thus formed was composed of cured materials 61, 62, 63a, and 63b.

Figure 3:
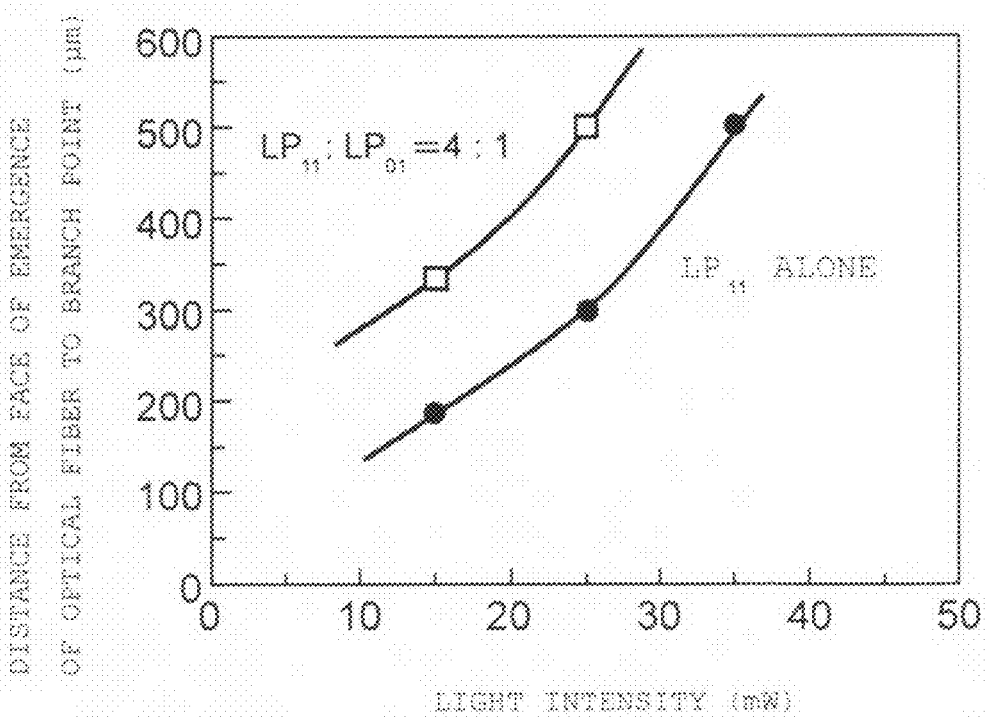
FIG. 3 is a graph showing the distance between an end face of an optical fiber and a branch point as a function of the light intensity in Examples 1 and 2.

When the radiant power from the face of emergence 11 of the optical fiber 1 was varied to 15, 25, and 35 mW, the distance L from the face of emergence 11 of the optical fiber 1 to the branch portion 62 (a distance from the face of emergence 11 to a point of contact between the cured material 63a and the cured material 63b) was varied as shown by the curve indicated by the filled circles in FIG. 3. The results show that the length of the linear portion 61 increases with increasing radiant power of the curing light.

Example 2

The positional relationship between the optical fiber 1 and the lens 3 was adjusted so that the ratio of the light intensity of the $LP_{11}$ mode to the light intensity of the $LP_{01}$ mode was four at the face of emergence 11 of the optical fiber 1. An optical waveguide 60 was formed as in Example 1. When the radiant power from the face of emergence 11 of the optical fiber 1 was varied to 15 and 25 mW, the distance L from the face of emergence 11 of the optical fiber 1 to the branch portion 62 (a distance from the face of emergence 11 to a point of contact between the cured material 63a and the cured material 63b) was varied as shown by the curve indicated by the open squares in FIG. 3. The $LP_{01}$ mode has a "unimodal" light intensity distribution. The $LP_{11}$ mode has a "bimodal" light intensity distribution. The results show that the use of the combined curing light of the "bimodal" $LP_{11}$ mode and the "unimodal" $LP_{01}$ mode resulted in a larger distance from the face of emergence 11 of the optical fiber 1 to the branch portion 62 than that obtained with the curing light composed only of the "bimodal" $LP_{11}$ mode.

Comparative Example

The positional relationship between the optical fiber 1 and the lens 3 was adjusted so that only the $LP_{01}$ mode was emitted from the face of emergence 11 of the optical fiber 1. No branch was formed, and only a cylindrical optical waveguide of a cured material 61 was formed.

Example 3

A radical polymerization type photocurable resin (modified acrylate, Loctite (trade name) product number 358, the refractive index of cured material at a wavelength of 589 nm is 1.511) was used as a photocurable resin. The photocurable resin was applied to a substrate (slide glass), and was irradiated with ultraviolet rays at about 20 to 50 mJ/cm$^2$ to be photopolymerized into a gel film (having a thickness of about 0.3 mm). In the same way as Example 1, except that the gel film was used as the photocurable resin gel 5, an optical waveguide 60 composed of cured materials 61, 62, 63a, and 63b was formed.

Example 4

Branched optical transmission lines were formed as in Examples 1, 2, and 3, except that the optical fiber was replaced with a polarization-maintaining fiber. At that time, optical transmission lines were formed for two cases in which the polarization directions of the $LP_{11}$ mode were different by 90 degrees. According to this method two kinds of the optical transmission line with two branches were able to be formed, in which the respective direction of the branch was different from each other by a right angle. That is, one kind of the optical transmission line with two branches was able to be formed on a plane parallel to the main surface of the substrate slide glass 4, and the other kind of the optical transmission line with two branches was able to be formed on a plane perpendicular to the main surface. This demonstrated that when a polarization-maintaining fiber was used as an optical fiber to transmit curing light, and the orientation of an electric power intensity distribution pattern of the curing light was consistently adjusted to be a desired direction at the face of emergence of the fiber, the branching direction of optical transmission lines could be adjusted to be any direction.

While the optical fiber used in the examples was a general single-mode optical fiber, in an optical system having a consistently stable modal distribution at the face of emergence, a multimode fiber or another fiber may be used without problems. When a general single-mode optical fiber is used, the plane of polarization may rotate during transmission, and the branching direction may fluctuate in a range of 360 degrees. To prevent this, a polarization-maintaining fiber may be used to form a more stable branching waveguide.

While the photocurable resins used in the present examples were mainly composed of common acrylate monomers, the photocurable resins are not limited to these specific monomers. As long as a common material has a polymerization rate that varies in accordance with the radiation intensity of light, the same results can be achieved with any radical polymerization type acrylate, any cationic polymerization type epoxy or oxetane, or a liquid mixture thereof.

The impregnation with a photocurable resin having a low refractive index may be performed by spraying, dipping, spin coating, or the like. The photocurable resin having a low refractive index for use in the impregnation may be any material, provided that the photocurable resin has high mutual solubility with or a high impregnating ability to a material used as a film.

The invention claimed is:

1. A method for manufacturing an optical waveguide, said method comprising:
   connecting an optical fiber to an uncured photocurable resin, and irradiating the photocurable resin with curing light that is introduced through the optical fiber at a higher mode of a Linear Polarized (LP) mode and has a wavelength at which the photocurable resin can be cured, thereby forming a core in a self-writing that includes a linear portion, a branch portion linked to the linear portion, and at least two branches extending from the branch portion.

2. The method for manufacturing an optical waveguide according to claim 1, wherein the photocurable resin before being irradiated with the curing light comprises a photocurable resin gel.

3. The method for manufacturing an optical waveguide according to claim 1, wherein the curing light is introduced at both the higher mode and a lower mode of the LP mode.

4. The method for manufacturing an optical waveguide according to claim 2, wherein the curing light is introduced at both the higher mode and a lower mode of the LP mode.

5. The method for manufacturing an optical waveguide according to claim 3, wherein the lower mode comprises an $LP_{01}$ mode, and a ratio of a light intensity of the higher mode to a light intensity of the $LP_{01}$ mode is controlled to adjust a length of the linear portion.

6. The method for manufacturing an optical waveguide according to claim 4, wherein lower mode comprises an $LP_{01}$ mode, and a ratio of a light intensity of the higher mode to a light intensity of the $LP_{01}$ mode is controlled to adjust a length of the linear portion.

7. The method for manufacturing an optical waveguide according to claim 1, wherein a light intensity of the curing light is controlled to adjust a length of the linear portion.

8. The method for manufacturing an optical waveguide according to claim 2, wherein a light intensity of the curing light is controlled to adjust a length of the linear portion.

9. The method for manufacturing an optical waveguide according to claim 3, wherein a light intensity of the curing light is controlled to adjust a length of the linear portion.

10. The method for manufacturing an optical waveguide according to claim 4, wherein a light intensity of the curing light is controlled to adjust a length of the linear portion.

11. The method for manufacturing an optical waveguide according to claim 5, wherein a light intensity of the curing light is controlled to adjust a length of the linear portion.

12. The method for manufacturing an optical waveguide according to claim 1, wherein the optical fiber comprises a polarization-maintaining fiber, and a polarization direction of the curing light emitted from the optical fiber is adjusted to be a predetermined direction to control a branching direction at the branch portion.

13. The method for manufacturing an optical waveguide according to claim 2, wherein the optical fiber comprises a polarization-maintaining fiber, and a polarization direction of the curing light emitted from the optical fiber is adjusted to be a predetermined direction to control a branching direction at the branch portion.

14. The method for manufacturing an optical waveguide according to claim 3, wherein the optical fiber comprises a polarization-maintaining fiber, and a polarization direction of the curing light emitted from the optical fiber is adjusted to be a predetermined direction to control a branching direction at the branch portion.

15. The method for manufacturing an optical waveguide according to claim 5, wherein the optical fiber comprises a polarization-maintaining fiber, and a polarization direction of the curing light emitted from the optical fiber is adjusted to be a predetermined direction to control a branching direction at the branch portion.

16. The method for manufacturing an optical waveguide according to claim 7, wherein the optical fiber comprises a polarization-maintaining fiber, and a polarization direction of the curing light emitted from the optical fiber is adjusted to be a predetermined direction to control a branching direction at the branch portion.

17. The method for manufacturing an optical waveguide according to claim 8, wherein the optical fiber comprises a polarization-maintaining fiber, and a polarization direction of the curing light emitted from the optical fiber is adjusted to be a predetermined direction to control a branching direction at the branch portion.

18. The method for manufacturing an optical waveguide according to claim 1, wherein the core is formed in a curing light traveling direction while confining the curing light along an optical path of a light beam emitted from the optical fiber.

* * * * *

UNITED STATES PATENT AND TRADEMARK OFFICE
CERTIFICATE OF CORRECTION

PATENT NO.         : 7,907,808 B2
APPLICATION NO.    : 11/991458
DATED              : March 15, 2011
INVENTOR(S)        : Manabu Kagami et al.

It is certified that error appears in the above-identified patent and that said Letters Patent is hereby corrected as shown below:

(73) Please correct Assignees: should read

KABUSHIKI KAISHA TO<u>YO</u>T<u>A</u> CHUO KENKYUSHO, and

NATIONAL UNIVERSITY CORPORATION SHIZUOKA UNIVERSITY FACU<u>LTY</u> OF ENGINEERING

Signed and Sealed this
Tenth Day of May, 2011

David J. Kappos
*Director of the United States Patent and Trademark Office*